United States Patent [19]

Schachte et al.

[11] 4,153,863

[45] May 8, 1979

[54] DC MOTOR CONTROLLER

[75] Inventors: John J. Schachte, Charlotte, N.C.; Geoffrey A. Ross, Canton Center, Conn.

[73] Assignee: Colt Industries Operating Corp. (Pratt & Whitney Machine Tool Division), West Hartford, Conn.

[21] Appl. No.: 789,532

[22] Filed: Apr. 20, 1977

[51] Int. Cl.² .............................................. G05B 5/01
[52] U.S. Cl. .................................. 318/341; 318/318
[58] Field of Search ............... 318/341, 314, 318, 227; 363/79

[56] References Cited

U.S. PATENT DOCUMENTS

| 3,621,354 | 11/1971 | Fawcett et al. | 318/341 |
| 3,803,476 | 4/1974 | Reeve | 363/79 |
| 3,838,325 | 9/1974 | Kobayashi et al. | 318/341 |
| 3,946,293 | 3/1976 | Feld | 318/227 |

OTHER PUBLICATIONS

Bose et al. "Digital Speed Control of a DC Motor with Phase-Locked Loop Regulation" IECI Proceedings 4-77.

Primary Examiner—David Smith, Jr.
Attorney, Agent, or Firm—Radford W. Luther; Richard A. Dornon

[57] ABSTRACT

A speed and position controller for a DC motor, having SCR power circuits, has a digital computing device directly connected to the SCR firing circuits for controlling the SCR firing angle. A command signal in the form of a number is applied to the computing device from a tape reader or other command signal generator. An encoder, operatively connected to the shaft of the motor, furnishes a feedback pulse frequency indicative of motor speed to a counter. The computing device periodically samples the number in the counter for speed and position computations. The computed firing angles are compared with maximum firing angles loaded into the computing device to prevent excessive currents which could cause arcing or demagnetization.

1 Claim, 10 Drawing Figures

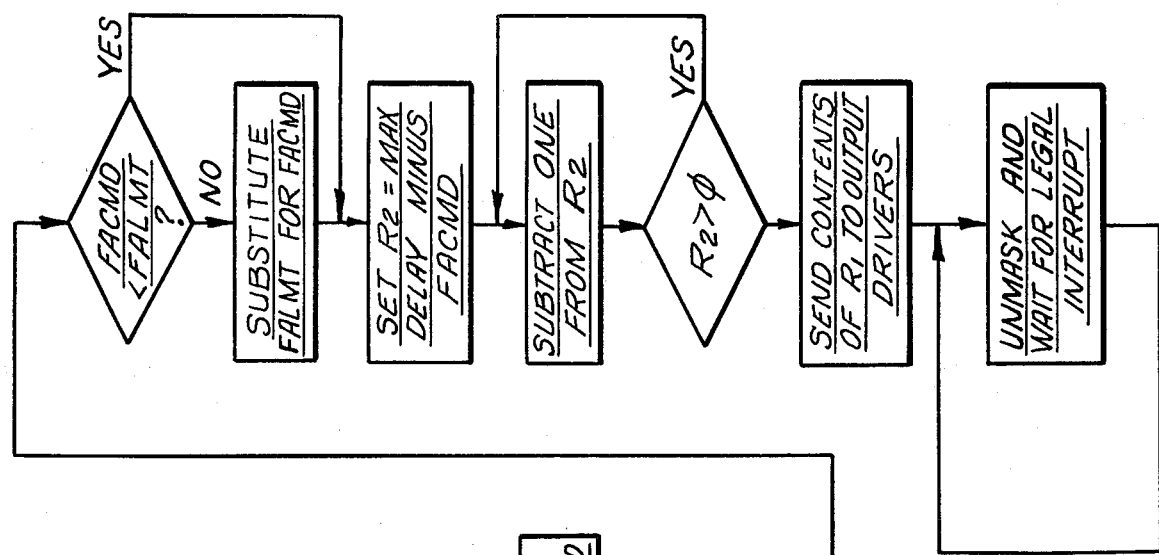
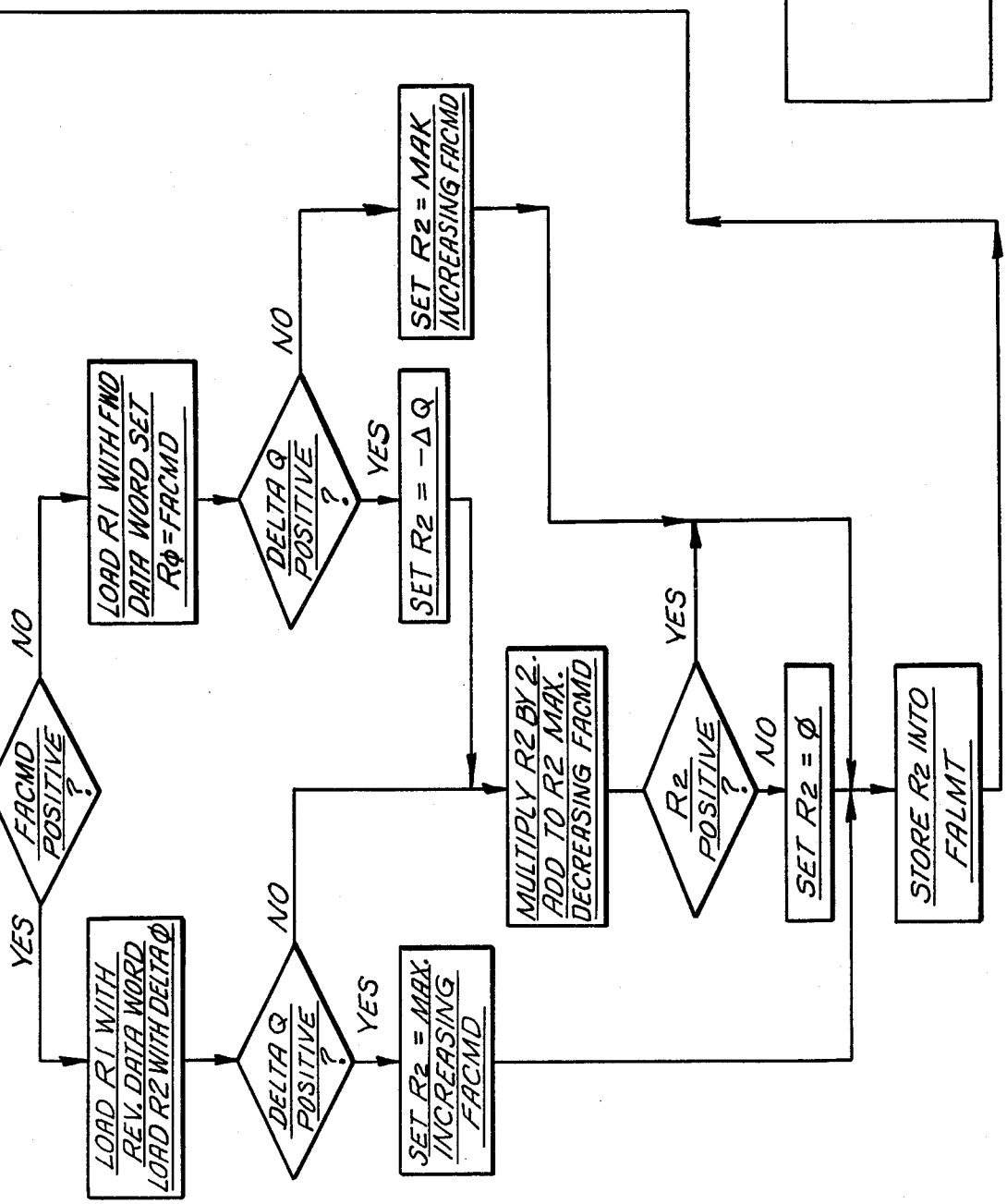
Fig. 10

DC MOTOR CONTROLLER

BACKGROUND OF THE INVENTION

This invention relates to control devices for electric motors.

Prior art controls for DC motors have not been comprised of purely digital components although the position logic and velocity compensation logic have been constituted by digital elements. Specifically, such controls include a digital to analog converter which directs signals to a DC drive amplifier. The output of the drive amplifier is, in turn, applied to a threshold comparator, which also has as an input a ramp wave form. In addition, such controls have included further analog circuitry, usually in the form of printed circuit cards, to sense and limit armature current, control amplifier saturation and to insure proper balance between forward and reverse SCR's before motion is called for.

Succinctly stated, existing controls are constituted by a significant amount of analog hardware which is relatively expensive and subject to signal drift. In addition, state-of-the-art controls which have an armature current limiting capability must first sense an overcurrent condition before reducing the firing angle. The problem encountered with such a protective scheme is that arcing or demagnetization can easily occur before corrective action is taken.

SUMMARY OF THE INVENTION

The invention provides a DC motor control which is digital in nature and therefore not subject to drift. Furthermore, since the invention can utilize a microprocessor, significantly less hardware is required, thereby increasing reliability and decreasing costs. Also noteworthy is the fact that since current variations for firing angle changes have been found to be predictable, open loop current protection can be programmed into the control.

The invention comprises a DC motor control having a digital computing device which receives a command signal in the form of a number from a digital command signal generator, such as a tape reader and associated elements. The digital computing device may, if necessary, be operatively connected to a bi-directional counter which counts pulses from an encoder operatively associated with the shaft of the motor. The computing device periodically samples the contents of the counter to receive data indicative of the velocity and position of a controlled object.

An SCR power panel, having trigger circuits and power circuits, is connected to the motor for controlling armature current duration in the usual manner. Power is supplied to the SCR panel from a source of AC power. The digital pulses from the computing device are amplified by an output device, which constitutes a part thereof, and thence are applied to the trigger circuits. The pulses from the computing device are delivered to the trigger circuits at a computed time relative to an interrupt wave form synchronized with the AC power line.

Accordingly, it is a primary object of the invention to provide a purely digital control for a DC motor.

Another object is to provide a digital control for a DC motor which incorporates open loop overcurrent protection.

These and other objects and advantages of the invention will become more readily apparent from the following detailed description, when taken in conjunction with the accompanying drawings, in which:

BRIEF DESCRIPTION OF THE DRAWINGS

FIGS. 8, 9 and 10 are flow charts illustrating preferred steps to be performed by a minicomputer or microcomputer to carry out the invention.

DETAILED DESCRIPTION OF PREFERRED EMBODIMENTS

Figure 1:
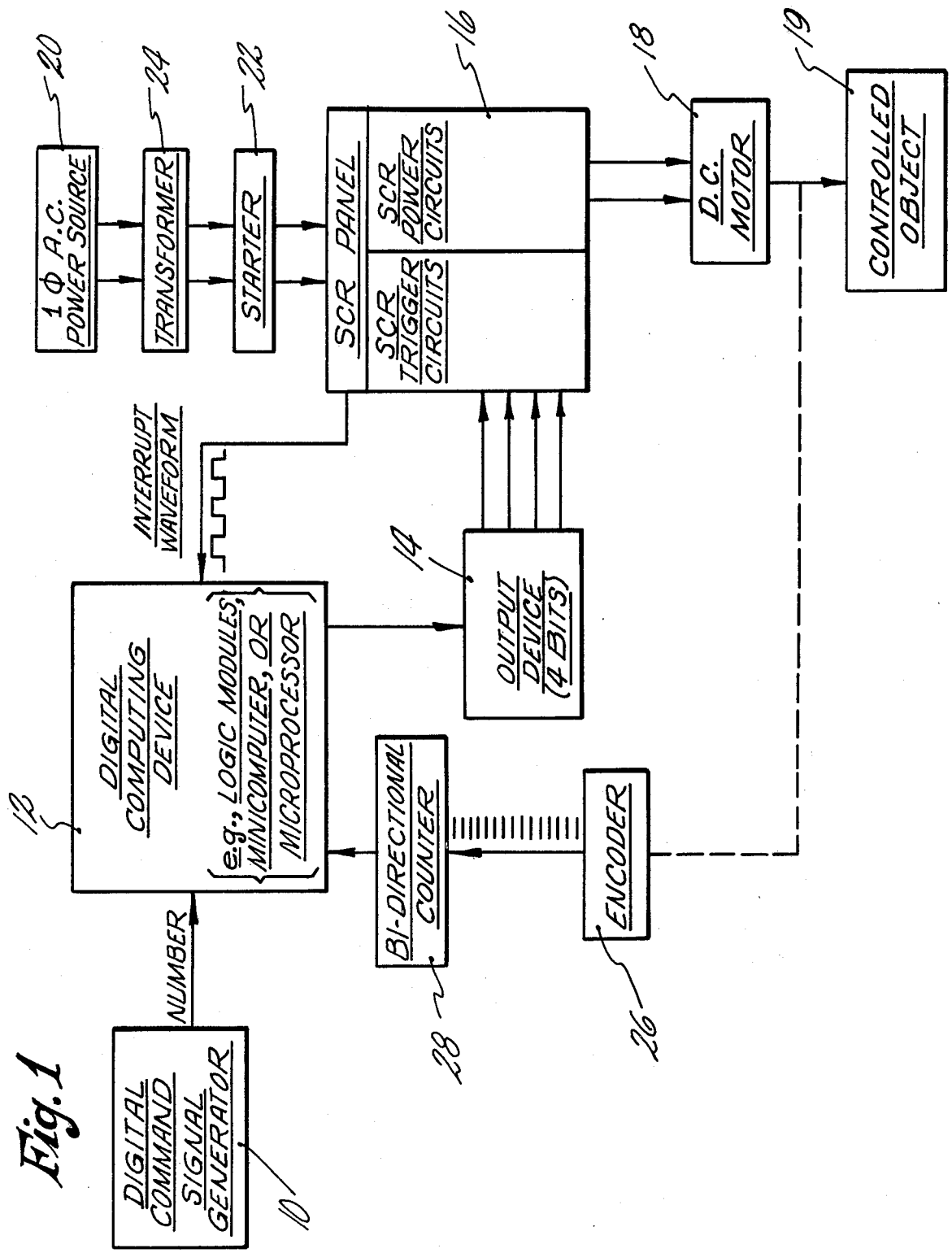
FIG. 1 is a functional block diagram of a DC motor control system according to the invention, shown in conjunction with a permanent magnet DC motor.

Referring to FIG. 1, a digital command signal generator 10, which may incorporate a suitable tape reader, is adapted to generate a numerical command signal. The command signal is applied to a digital computing device 12 which may be constituted by digital control modules, a minicomputer or a microprocessor based microcomputer. The digital computing device 12 also embodies an output device 14, four bits of which are utilized. The output device 14 applies switching signals to an SCR panel 16 for a permanent magnet DC motor 18 to selectively activate the panel's SCR trigger circuits which apply gating pulses to the panel's SCR power circuits. The SCR panel 16 is shown connected to a single phase source of AC power 20 via a starter 22 and a transformer 24, although a three phase source of power would also be suitable. The SCR panel also contains circuitry to generate an interrupt wave form, synchronized with the AC power wave form, which is applied to the computing device 12.

The DC motor 18, which is adapted to position a controlled object 19, such as slide, has its shaft speed sensed by an encoder 26 which generates a pulse frequency proportional to the speed of the motor 18. If the digital computing device 12 comprises a microprocessor which operates at relatively slow clock rates, it will be necessary to furnish a peripheral unit in the form of a bi-directional counter 28 for receiving pulses from the encoder. The number in the counter 28 will be periodically sampled to provide velocity and position information.

Figure 2:
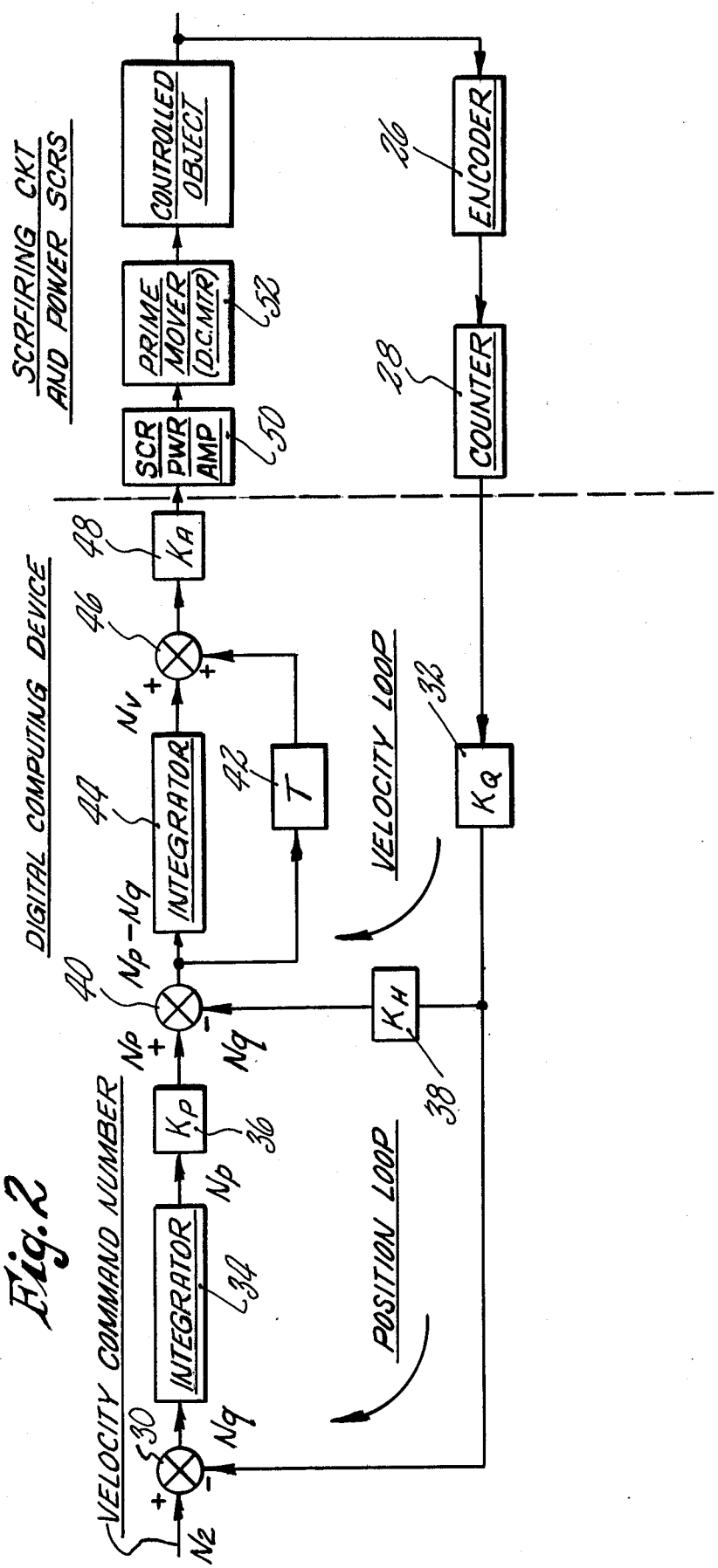
FIG. 2 is a simplified servo control block diagram illustrating the functioning of the digital computing device of FIG. 1.

Turning now to FIG. 2, a functional development of the servo control performed by the digital computing device 12 is depicted. In FIG. 2, the velocity command number $N_z$ is applied to a summing device 30 periodically, the magnitude thereof being indicative of the commanded velocity of the controlled part, i.e., controlled object 19. The feedback number $N_q$ from scaler 32 is also applied to summing device 30 periodically, the magnitude thereof being indicative of the actual velocity of the controlled part. The algebraic summation of the $N_z$ and $N_q$ numbers produces a velocity error $(N_z - N_q)$ or lag which is the numeric count periodically summed by an integrator 34. The periodic algebraic summation of $N_z$ and $N_q$ numbers is in effect an integration of the servo system velocity error which results in a numerical magnitude representing the system position error. This position error $N_p$ is then applied to a scaler 36. The magnitude of the number $N_p$ thus represents a velocity command that is a function of the system position error.

Then the $N_p$ number from the scaler 36 is algebraically summed with the $N_q$ number from a scaler 38 at summing device 40. This results in a number $(N_p - N_q)$ which is the velocity error and is directly applied to a scaler 42 for multiplication. In the disclosed servo system the same counter is utilized to establish both the position and velocity loops.

The number which is the difference $(N_p - N_q)$ is summed as a function of time in integrator 44. Numbers $(N_p - N_q)$ and $N_v$, the result of the integration, are summed by a summing device 46 and applied to an SCR power amplifier 50 via scaler 48 to control operation of prime mover 52. Hence, it will be appreciated that proportional plus integral control is provided in the velocity loop.

The letters ($K_p$, $K_h$, $K_q$, T and $K_a$) inside the scalers are, of course, indicative of gains in various portions of the control loop. It should also be noted that the integrator 44, the scaler 42, and the summing junction 46, all of which are constituted by digital elements, represent a typical lead-lag compensation scheme in a velocity servo system.

Figure 3:
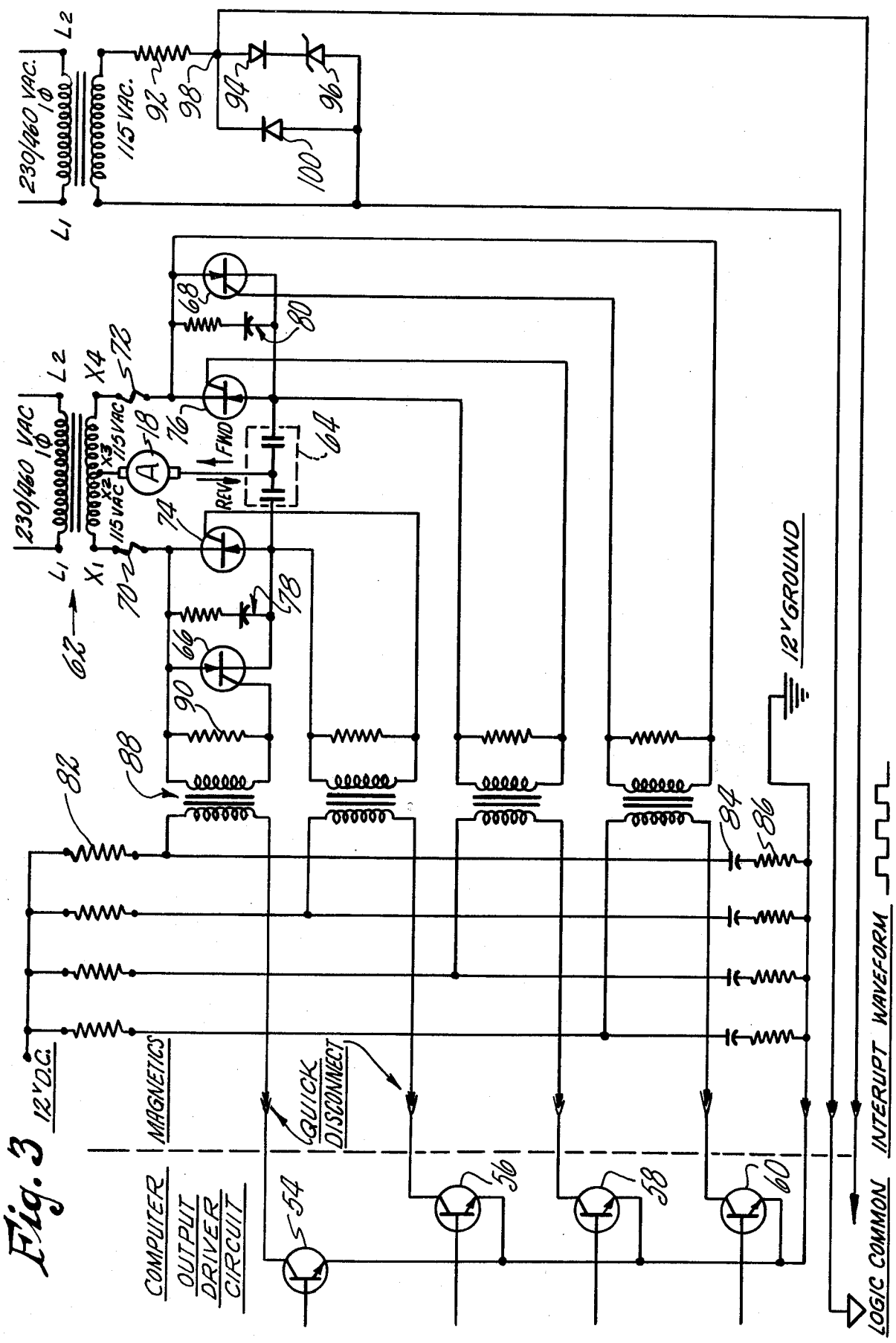
FIG. 3 is a schematic diagram of the SCR panel of FIG. 1.

With reference to FIG. 3, a schematic of the SCR panel is presented. As illustrated in FIG. 3, the output device has four switching NPN transistors 54, 56, 58, and 60 which constitute a part of the output driver circuit thereof. Each transistor causes a particular SCR power switch to fire when turned on by gate signal.

The armature, designated by the letter A, of the motor 18 is connected to the center tap of the secondary of a main transformer 62 and to a motor contactor 64. Forward current, i.e., current (which causes forward rotation of the motor) from the contractor 64 to the center tap of transformer 62, is controlled by forward positive SCR 66 and forward negative SCR 68, which respectively have their anodes connected to the end terminals $X_1$ and $X_4$ of the transformers secondary via fuses 70 and 72 and respectively have their cathodes connected to opposite sides of the motor contactor 64. Connected respectively in parallel with the SCR's 66 and 68 are reverse negative SCR 74 and reverse positive SCR 76 for conducting reverse current through the armature, i.e., current (which causes reverse motor rotation) flowing from the center tap terminals $X_2$ and $X_3$ of the transformer 62 to the motor contactor 64. As shown in FIG. 3, the reverse SCR's 74 and 76 have their respective cathodes connected to the end terminals $X_1$ and $X_4$ of the secondary of the transformer 62 and their respective anodes to opposite sides of the motor contactor 64.

For forward motor rotation, during the positive going 115$^v$ wave forms, wherein the potential difference, between terminals $X_1$ and $X_4$ is positive, SCR 66 is fired; and during negative going 115$^v$ wave forms, SCR 68 is fired, conduction in both instances being maintained until the 115$^v$ wave forms again cross the zero datum. Conversely, for reverse motor rotation, SCR 74 is fired during negative going 115$^v$ wave forms and SCR 76 is fired during positive going wave forms. Generally speaking, the point (or firing angle) in the respective voltage wave forms where the SCR's are gated, of course, determines the applied voltage and, hence, motor speed for a given load. In order to prevent fast rising voltage wave forms from appearing across the SCR's that have a dv/dt which might cause charging currents in the SCR junction capacitances to engender spurious conductions, RC snubbers 78 and 80 are respectively connected in parallel with SCR's 66 and 74 and with SCR's 68 and 76.

Each of the SCR's has its own trigger circuit for applying a gating signal to its gate and thereby rendering it conductive. The trigger circuits are hard-firing to deliver a gate current of high magnitude with a short rise time. Since the trigger circuits are identical, only the one associated with the SCR 66 will be hereinafter described.

A source of 12$^v$ DC potential is connected to a line which includes a resistor 82, a capacitor 84 and resistor 86 in series relationship. The resistor 86 is connected to the ground of the 12$^v$ power supply. A pulse transformer 88 has one of the end terminals of its primary connected between the resistance 82 and capacitor 84 and the other end terminal thereof to the collector of the transistor 54 which has its emitter grounded. A resistor 90 is connected across the secondary of the transformer 88 to control gate current.

When transistor 54 is in the off state, the capacitor is charged by current flowing to ground via resistors 82 and 86. When transistor 54 is turned on, the capacitor 84 discharges through the primary of the pulse transformer 88, and transistor 54 to ground. The provision of such a capacitor allows the impressed voltage across the pulse transformer 88 to define a wider and steeper pulse for proper gating of the SCR. The pulse generated by transformer 88, which is impressed across resistor 90, triggers the SCR 66 on. SCR 66, of course, remains conductive for the remainder of the positive-going half cycle of its exciting voltage until the voltage swings negative. During the succeeding negative half cycle, the other forward SCR (SCR 68) is fired by turning on transistor 60. Because of the fact that the SCR's 66 and 68 are fired on alternative half cycles, a full wave rectification function is effected which provides the armature of motor 18 with a pulsating DC current having an average value determined by the time (firing angle) during each half cycle at which the respective SCR's are fired. It should be evident that the reverse SCR's 74 and 76 are operated in a similar manner by transistors 56 and 68.

The SCR panel also comprises a wave shaping circuit for generating a somewhat square interrupt wave form, synchronized with the power wave form generated by the transformer 62. The wave shaping circuit comprises a series connected current limiting resistor 92, and diode 94 and a zener diode 96 connected across the secondary of a transformer, an end terminal of which is referenced to logic common potential. When the positive going wave form reaches the sum of the zener voltage and the threshold voltage of the diode 94, the voltage wave form at the node 98 between resistor 92 and diode 94 is somewhat squared. A diode 100 is provided between logic common and node 98 to clamp the negative going portion of the wave form at node 98 to common potential. Obviously, the wave shaping circuit could be constituted by a zener diode, alone, in combination with a resistance or by a circuit comprising an operational amplifier, as is well-known to those skilled in the art. Suffice it to say that the particular circuit selected to provide a synchronized wave form of reduced maximum voltage admits of many variations and the details thereof form no part of the invention.

Figure 4:
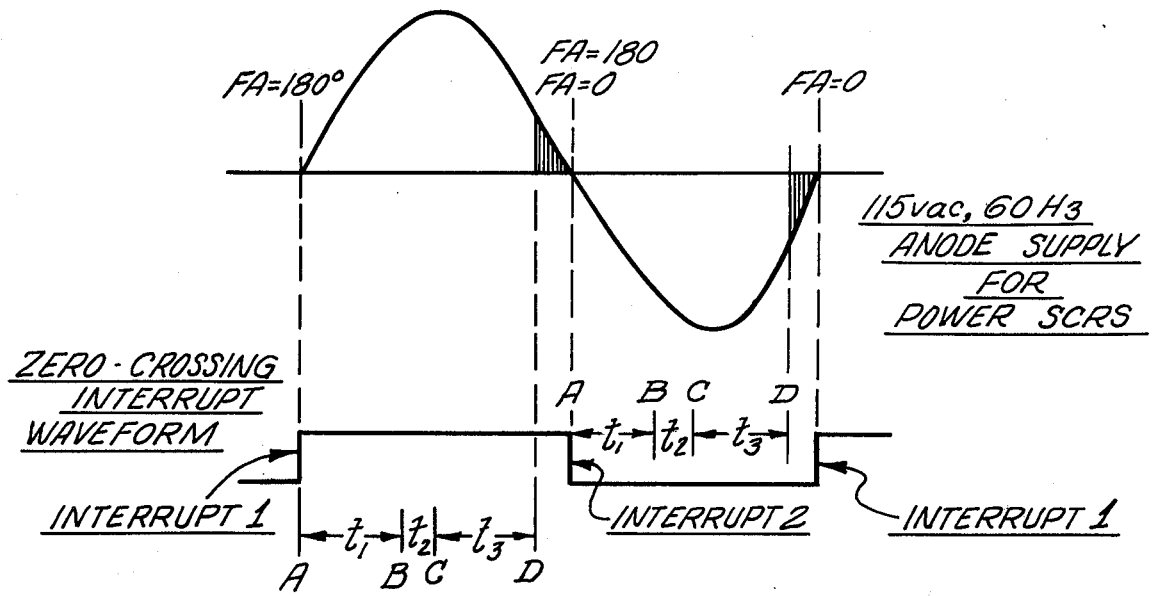
FIG. 4 is a graph showing the relationship between the anode supply wave form for the SCR power circuits and the interrupt wave form upon which timing of the gating pulses is predicated.

Turning to FIG. 4, the anode power supply wave form for the SCR's is shown in conjunction with the interrupt wave form which is synchronized therewith. As a matter of convenience, the interrupt wave form is depicted as a square wave whereas the sides of the wave actually follow the anode supply sine wave. It will be understood, of course, that the interrupt signal need not be a square wave or even approximate a square wave but must have fast transitions.

In FIG. 4, the point A is that point in the interrupt wave form where an interrupt signal is applied to the digital computing device 12. At the point B, the bi-directional counter 28 is sampled and firing angle computation is initiated. At point C, computation is completed, and at point D, the appropriate SCR is fired. Hence, in a full cycle of the interrupt wave form, both SCR's in either the forward pair or the reverse pair are normally fired in succession, depending on the sense of motor rotation.

The time $t_1$ (from point A to B) is a fixed delay time. The time $t_2$ (from point B to C) is the servo computation time and is also fixed. The time $t_3$ (from point C to D) is the computed delay time from completion of computation to the firing time and is, of course, representative of the computed firing angle. Obviously, all firing angles from 0° to 180° are not available since firing cannot be commanded during the time period $t_1$ or the time period $t_2$. It should be noted, however, that $t_1$ and $t_2$ need not occupy more than a 30° (1/720 sec.) firing angle spectrum and that firing angles above 150° are not normally needed in the motor control since little additional power is generated beyond such an angle.

Figure 5:
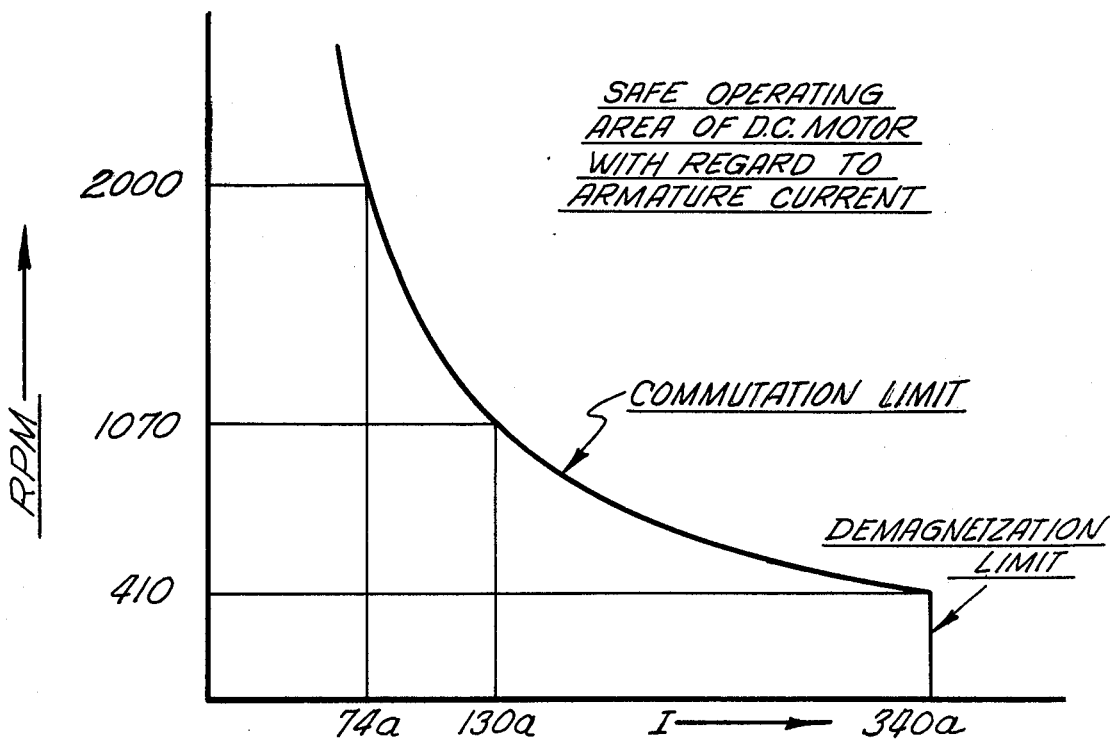
FIG. 5 is a graph showing the maximum safe current limits versus motor speed for a particular permanent magnet DC motor.
Figure 6:
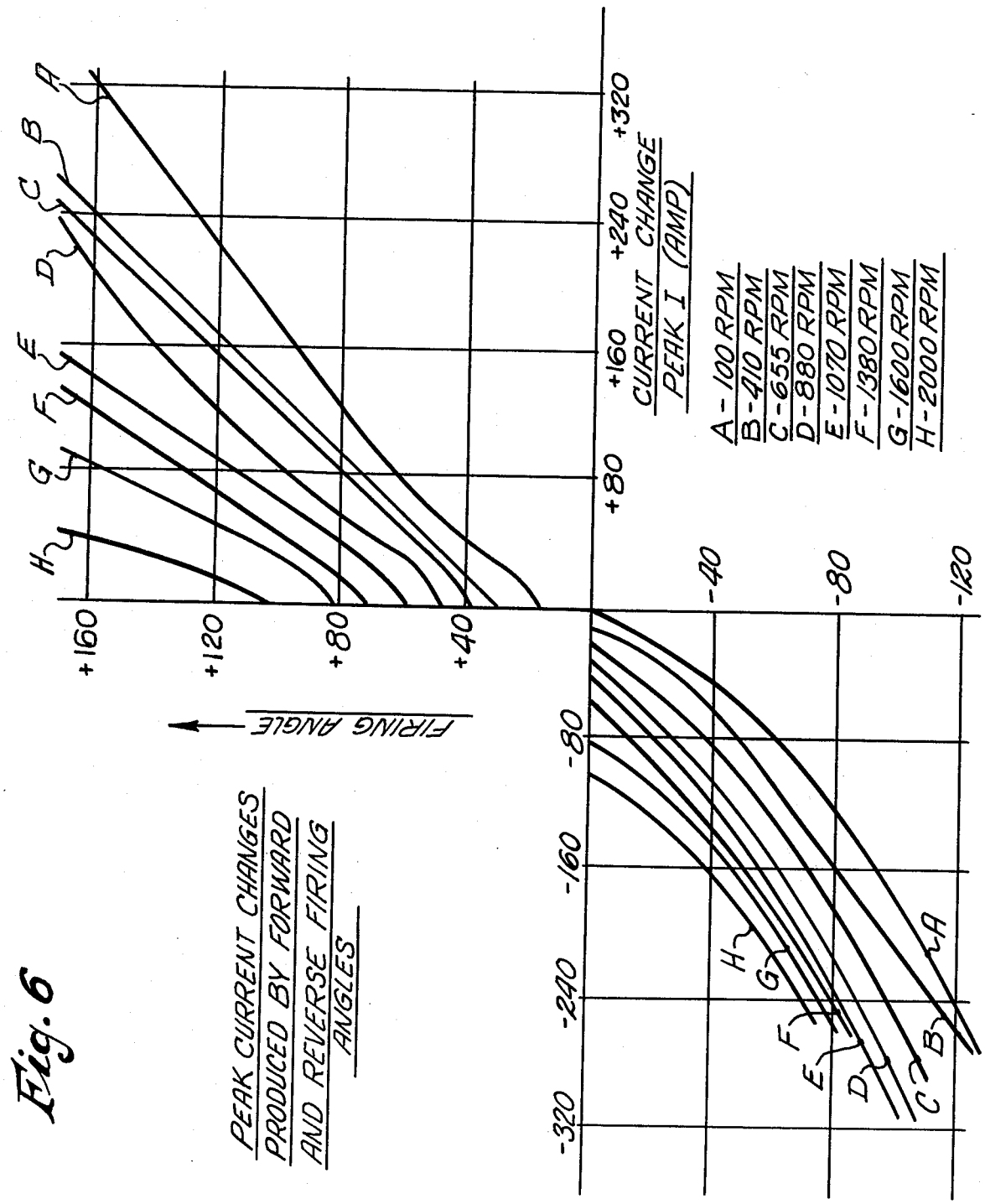
FIG. 6 is a graph showing peak current variations at various motor speeds produced by selected forward and reverse firing angles.
Figure 7:
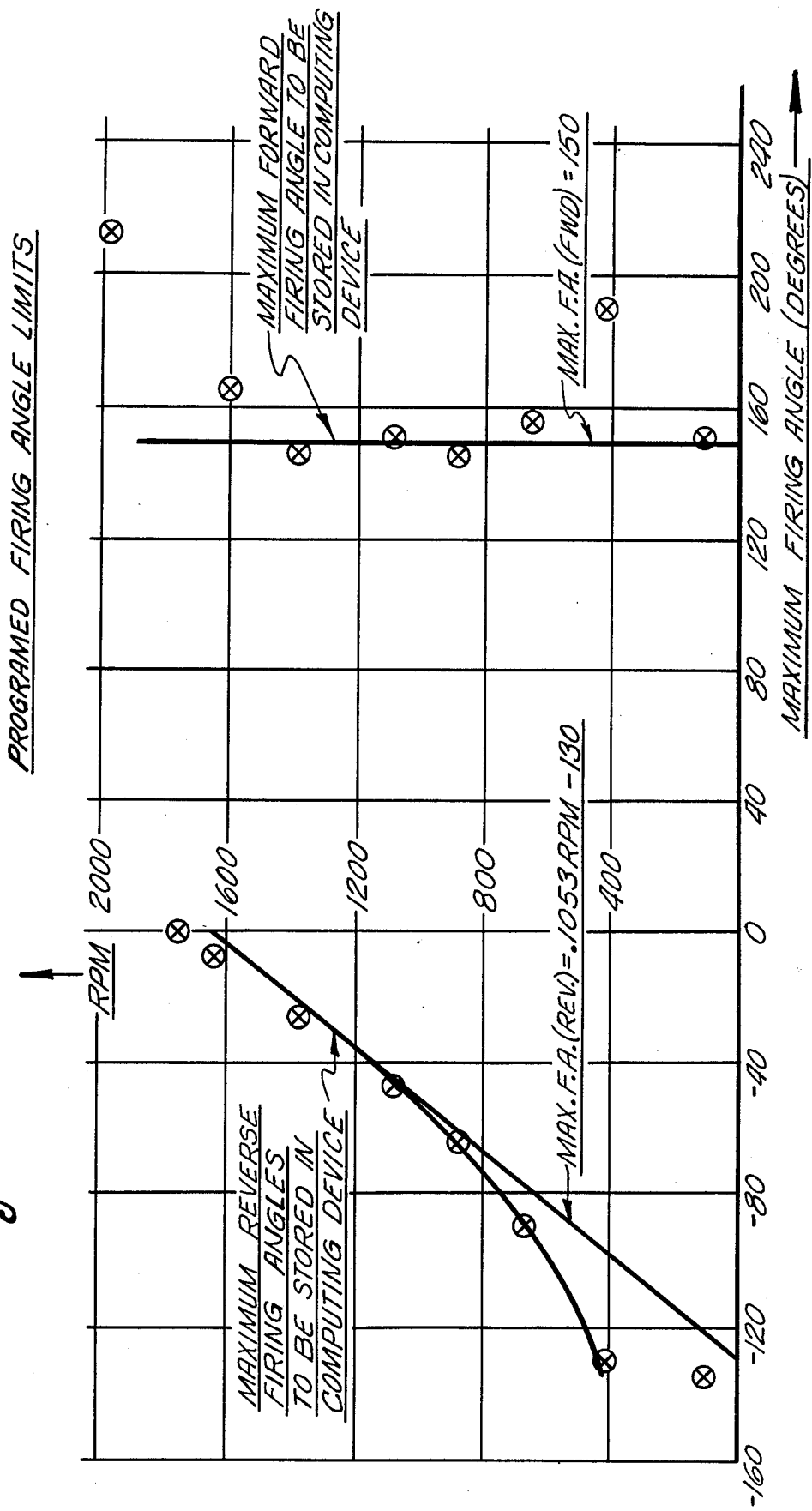
FIG. 7 is a graph showing the relationship between motor speed and maximum allowable forward and reverse firing angles which is programmed into the digital computing device of FIG. 1.

With reference to FIGS. 5, 6, and 7, the graphs, which enable the current limit programs to be determined, are presented.

FIG. 5 shows the relationship between maximum current and speed for a particular permanent magnet DC motor, such data usually being supplied by the manufacturer. Should the limit, therein shown, be exceeded, arcing and/or demagnetization may be occasioned.

FIG. 6 shows the peak current changes produced by applying various forward and reverse firing angles at different RPM's. FIG. 6, of course, is valid only for a particular DC motor, viz.: a Getty's size 20 permanent magnet motor. In order to experimentally obtain the graph of FIG. 6, the motor should be driven at a fixed firing angle which will produce a constant speed. This may be achieved by a simple computer program or by other means as will be appreciated by those skilled in the art. Various positive firing angles are then individually applied while the peak currents generated thereby are read on an oscilloscope. Since steady-state currents are negligible, the peak currents can be regarded as the induced current change. Subsequently, various negative firing angles are similarly applied and measured. This procedure is repeatedly carried out for selected firing angles throughout the motor's speed range. It should be noted that there is no need to place a load on the motor to obtain data for the graph of FIG. 6. At a speed of 1070 RPM, for example, a +120° firing angle causes a peak current of about +90 amps; and a step change to a −80° firing angle causes a peak reverse current of about −230 amps.

Since the maximum current produced by forward and reverse firing angle changes at various motor speeds are known and the maximum permissible currents for each RPM are shown in FIG. 5, a plot may be made of maximum forward and reverse firing angles versus speed (RPM) as shown in FIG. 7. To illustrate, the maximum current at 1070 RPM is 130 amps. From FIG. 6, it will be seen that forward firing angles greater than about 150° and reverse firing angles greater than about −65° produce currents beyond this limit. A plot of the points, as shown in FIG. 7, will permit simple functional relationships to be obtained for maximum firing angle versus speed. The solid lines of FIG. 7 represent limits which, although they do not connect the plotted points in an exact manner, may adequately serve as current limit functions. Hence, at all motor speeds a forward firing angle of say 150° may be used as the maximum. In addition, a simple linear relationship between reverse firing angle and speed will suffice.

Figure 8:
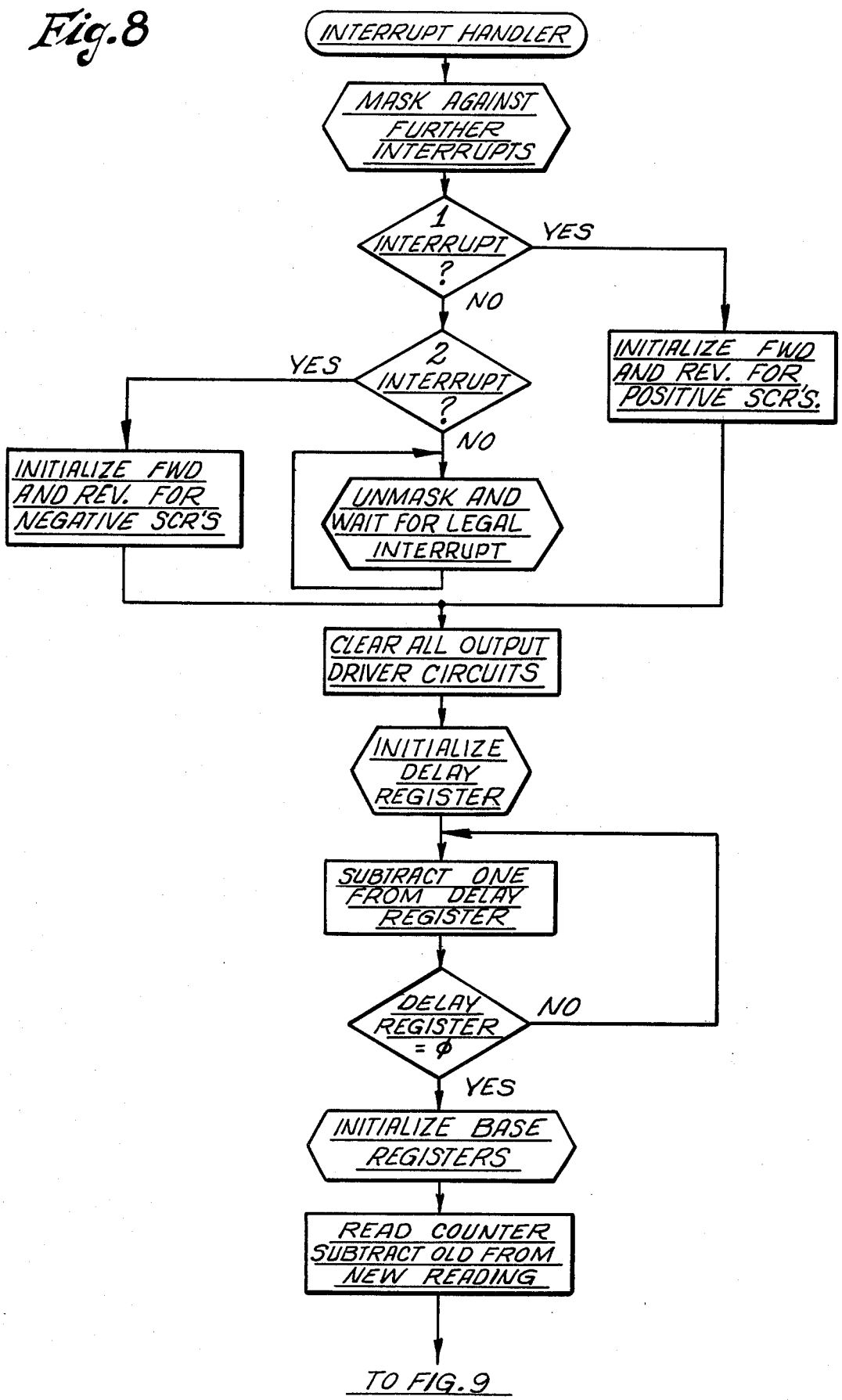
Figure 9:
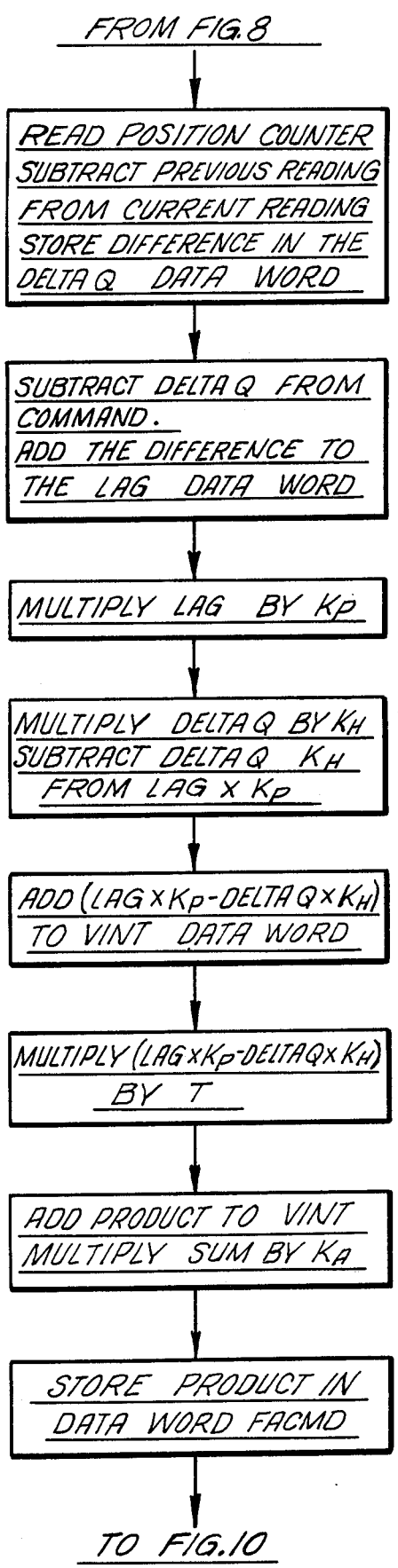

FIGS. 8, 9, and 10 show the steps which may be carried out by logic modules or a computer to accomplish the servo control scheme illustrated in FIG. 2. As used in the flow charts of FIGS. 8, 9, and 10, FWD and REV refer to current directions indicated on FIG. 3. Positive and negative are used in the conventional sense to indicate polarity of the voltage at terminal $X_1$ of transformer 62 with respect to the center tap. Interrupt 1 and interrupt 2 occur respectively at positive going and negative going zero datum crossings of the voltage at $X_1$ with respect to the center tap.

The interrupt handler program initializes the digital computing device whereby it may perform the necessary computations after receiving a legal interrupt. After masking, the interrupt signal is checked to ascertain whether it is interrupt 1 or interrupt 2. If it is interrupt 1, two data words "FWD" and "REV" are initialized for the positive SCR's 66 and 76 with the proper configuration of four bits each. If it is 2, the data words are initialized for the negative SCR's 74 and 68 with the proper configuration of four bits each. It will be appreciated, for example, that the four bit pattern in "FWD", which resulted from interrupt 1, is such that SCR 66 would be fired if delivered to the output driver circuits. Similarly, the four bit pattern in "FWD", which resulted from interrupt 2, is such that SCR 68 would be fired if applied to the output driver circuits. If the interrupt that has occurred is neither 1 nor 2, the computer is unmasked and readied for a legal interrupt. In like manner, "REV" is preset with a four bit pattern to fire the proper SCR. Finally, the interrupt handler clears all the output driver circuits.

A delay program begins by initializing a delay register which contains a number proportional to a previously determined maximum firing angle (150°) calculated empirically by measuring motor load currents at top speed. This number is counted down to produce a time delay ($t_1$) equal to full conduction time minus the sum of the maximum firing angle and the computation time ($t_2$).

When the delay register has been counted down to the number $\phi$ (zero) in the time $t_1$, the servo program commences with calculation of the firing angle. First, the number in the bi-directional counter 28 is sampled and the previous number therein is subtracted from the current reading. The difference between the current and previous reading is stored in the DELTA Q data word. Next, DELTA Q is subtracted from a command which is given in the form of position counts to be moved per line interrupt interval. This difference is now added to the LAG data word. The LAG data word is then multiplied by $K_p$ and DELTA Q is multiplied by $K_h$. The product DELTA Q·$K_h$ is subsequently subtracted from the product LAG·$K_p$. The result of this subtraction is added to the VINT data word. Thereafter, the result (LAG·$K_p$−DELTA Q·$K_h$) is multiplied by T and then added to the VINT data word. The sum of such addition is multiplied by $K_a$ and the product stored in the data word FACMD.

Shown in FIG. 10 is the current limit program and the continuation of the servo program. The current limit program inspects the sign of the FACMD data word. If FACMD is positive, register $R_1$ is loaded with the REV (reverse) data word and register $R_2$ is loaded with DELTA Q. If FACMD is negative, $R_1$ is loaded with the FWD data word and register $R_\phi$ is set equal the absolute value of FACMD. In each instance, the sign of DELTA Q is inspected, and for positive DELTA Q, the register $R_2$ is either set to the maximum increasing FACMD (shown on the right of FIG. 7) or minus DELTA Q; for negative DELTA Q, register $R_2$ either has its contents multiplied by 2 and then incremented by the maximum decreasing FACMD (shown on the left of FIG. 7) or the maximum increasing FACMD. After $R_2$ is set equal to minus DELTA Q (for negative FACMD), then the contents of $R_2$ are multiplied by 2 and incremented by the maximum decreasing FACMD. Should the contents of $R_2$ be positive (positive FACMD and negative DELTA Q or negative FACMD and positive DELTA Q), then the contents of $R_2$ are stored in the FALMT data word. For negative contents of $R_2$, then $R_2$ is set to zero and zero is stored in the data word FALMT. In the two situations where $R_2$ is set equal to the maximum increasing FACMD, the contents thereof are stored in the data word FALMT.

In summary, what the above comparison does is to store a constant in the firing angle limit (FALMT) data word when the FACMD will generate armature current of the same direction as the existing current. When the predicted current is of opposite direction to the existing current, then a limit which is inversely proportional to motor speed is computed and stored in the FALMT data word.

If the computed firing angle (data word) FACMD exceeds the computed limit (data word) FALMT, register $R_\phi$ is set equal to FALMT. The contents of $R_2$ are then set to the maximum delay time (a fixed number) minus FACMD or FALMT which is the time $t_3$ of FIG. 4. $R_2$ is then counted down to zero at which time the contents of $R_1$ are directed to the output driver. The digital computing device is then unmasked to await a legal interrupt. Returning to FIG. 8 after an interrupt is received, the computing device is again masked to prevent noise from commencing the program.

A program, written in T.I. 960B assembly language and adapted for use with a 960B minicomputer manufactured by Texas Instruments, Inc. which can carry out the steps set forth in FIGS. 8-10, is as follows:

| LABEL | OPERATOR | OPERAND | |
|---|---|---|---|
| | SSB | INTHAN | Interrupt Vector |

-continued

| LABEL | OPERATOR | OPERAND | |
|---|---|---|---|
| | | | at K '94' |
| INTHAN | DATA | 0 | |
| | DATA | 0 | |
| | DATA | 0+1 | |
| | LDS | 0+2 | |
| | DATA | 0+2 | |
| | DATA | X'810' | |
| | LA | 5,SRV01 | |
| | BBNE | INT1,0,SRV01 | |
| | BBNE | INT2,0,SRV02 | |
| | SETB | TIM6,0 | |
| | B | UNMASK | |
| SRV01 | LA | 0,1 | |
| | ST | 0,FWD | |
| | LA | 0,4 | |
| | ST | 0,REV | |
| | B | SRV03 | |
| SRV02 | LA | 0,2 | |
| | ST | 0,FWD | |
| | LA | 0,8 | |
| | ST | 0,REV | |
| SRV03 | LA | 0,0 | |
| | LDCR | (X'30',4),X'88' | |
| | B | DELAY | |
| FWD | DATA | 0 | |
| REV | DATA | 0 | |
| DELAY | LA | 0,992 | |
| | ARB | −1,0,0 | |
| SERVO | LA | 4,0 | |
| | LA | 5, SRVLIM | |
| | LA | 6,1 | |
| | LA | 7,X'E00' | |
| | LDCR | (X'170',3),X'8E' | |
| | STCR | (X'170',12),X'88' | |
| | L | 1,CTR | |
| | ST | 0,CTR | |
| | S | 0,X'89' | |
| | CML | (X'88',4),(0,5) | |
| | AA | 0,8192 | |
| | SA | 0,4096 | |
| | ST | 0,DELTA Q | |
| | L | 1,VELCMD | |
| | S | 1,X'88' | |
| | A | 1,LAG | |
| | B | LAGLMT | |
| RET1 | ST | 1,LAG | |
| | ST | 1,X'88' | |
| | A | 1,X'88' | |
| | L | 0,DELTA Q | |
| | MLA | 3,X'88' | |
| | S | 1,X'88' | |
| | L | 0,X'89' | |
| | A | 1,VINT | |
| | B | VINTLM | |
| RET2 | ST | 1,VINT | |
| | A | 1,X'88' | |
| | MLA | 2,X'88' | |
| | A | 0,X'89' | |
| | L | 1,X'88' | |
| | B | CURLMT | |
| RET3 | L | 1,REV | |
| | CR | 0,FALMT | |
| | BC | 12,0+4 | |
| | L | 0,FALMT | |
| | ST | 0,FACMD | |
| | LA | 2,120 | |
| | S | −1,0,2 | |
| | LDCR | (X'30',4),X'89' | |
| | SETB | INT1,0 | |
| | SETB | INT2,0 | |
| UNMASK | LDS | 0+2 | |
| | DATA | 0+2 | |
| | DATA | X'8180' | |
| | B | 0 | |
| LAGLMT | CML | (X'89',4),(2,5) | |
| | B | 0+6 | |
| | LA | 1,X'400' | |
| | B | RET1 | |
| | LA | 1,X'B00' | |
| | B | RET1 | |
| VINTLM | CML | (X'89',4),(4,5) | |

-continued

| LABEL | OPERATOR | OPERAND |
|---|---|---|
|  | B | $\emptyset$ + 6 |
|  | LA | 1,X'4$\emptyset$' |
|  | B | RET2 |
|  | LA | 1,X'FB$\emptyset$' |
|  | B | RET2 |
| SRVLIM | DATA | −2$\emptyset$48 |
|  | DATA | 2$\emptyset$48 |
| LAGLIM | DATA | −16,384 |
|  | DATA | 16,384 |
| VINLIM | DATA | −1$\emptyset$24 |
|  | DATA | 1$\emptyset$24 |
| DELTAQ | DATA | $\emptyset$ |
| LAG | DATA | $\emptyset$ |
| CTR | DATA | $\emptyset$ |
| VINT | DATA | $\emptyset$ |
| FACMD | DATA | $\emptyset$ |
| FALMT | DATA | $\emptyset$ |
| VELCMD | DATA | $\emptyset$ |
| CURLMT | BC | 12,NEGV |
|  | L | 1,REV |
|  | L | 2,DELTA Q |
|  | BC | 12,NEGQ |
| ALIKE | LA | 2,12$\emptyset$ |
|  | ST | 2,FALMT |
|  | B | RET3 |
| NEGV | L | 1,FWD |
|  | XORA | $\emptyset$,−1 |
|  | AA | $\emptyset$,1 |
|  | L | 2,DELTA Q |
|  | BC | 12,ALIKE |
|  | SA | 2,1 |
|  | KORA | 2,−1 |
| NEGQ | MLA | 1,X'8A' |
|  | AA | 2,116$\emptyset$ |
|  | BC | 1$\emptyset$,ALIKE + 2 |
|  | LA | 2,$\emptyset$ |
|  | B | ALIKE + 2 |
|  | END |  |

Obviously, many variations and mofidications are possible in light of the above teachings without departing from the scope or spirit of the invention as set forth in the appended claims.

We claim:

1. In a digital DC motor control device of the type having a source of AC power; switch means operatively connected to the source of AC power and the armature of the motor for directing a current through the armature; a trigger circuit operatively connected to the switch means for the turning on thereof; a digital command signal generator for generating a numerical command signal proportional to the desired motor speed; an encoder operatively connected to the motor for generating pulses having a frequency proportional to the speed thereof; a wave-shaping circuit for generating an interrupt wave form synchronized with the voltage waveform of the AC power source; a counter operatively associated with the encoder for counting the pulses generated thereby; and a digital computing device operatively connected to the digital command signal generator for receiving the numerical command signal, operatively connected to the wave-shaping circuit for receiving the interrupt wave form, operatively connected to the counter for periodically sampling the number therein and operatively connected to the trigger circuit for activation thereof, the digital computing device being adapted to compute desired firing angles for the switch means in accordance with the numerical command signal applied thereto; the improvement in the digital computing device comprising:

means to compute limit forward and reverse firing angles for a given motor speed, the limit firing angles being known to produce maximum acceptable armature currents; and means to compare a computed desired firing angle with a computed limit firing angle for providing a calculated firing angle which will not engender excessive armature currents which could cause arcing or demagnetization.

* * * * *